No. 712,333. Patented Oct. 28, 1902.
C. V. RICHEY.
ELECTRIC RAILWAY SIGNAL.
(Application filed Apr. 8, 1902.)
(No Model.)
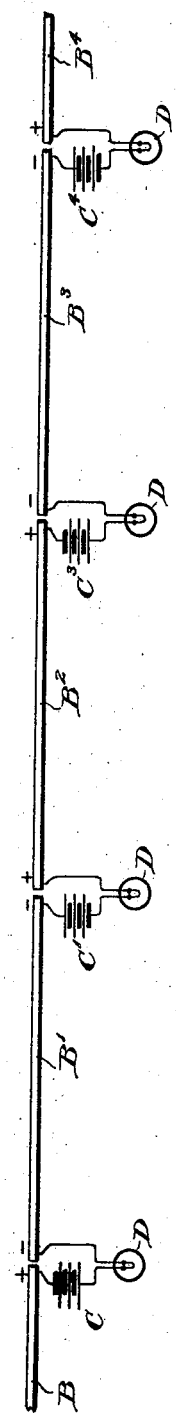
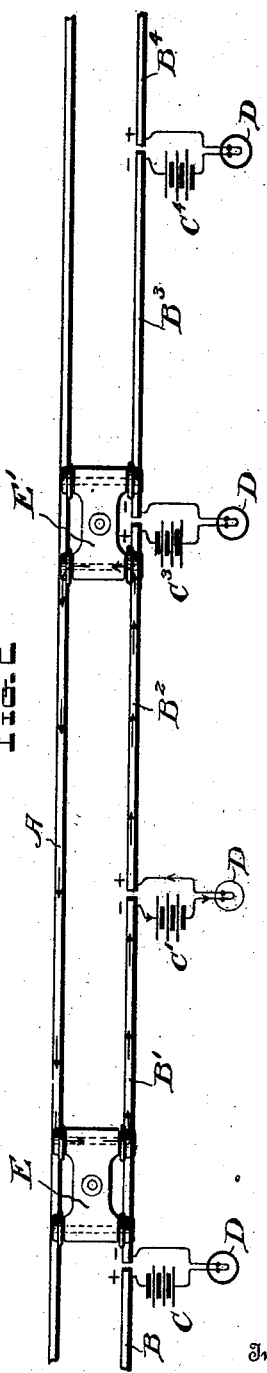
Inventor
C. V. Richey

UNITED STATES PATENT OFFICE.

CHARLES V. RICHEY, OF WASHINGTON, DISTRICT OF COLUMBIA, ASSIGNOR OF ONE-FOURTH TO LEONARD C. BAILEY, OF WASHINGTON, DISTRICT OF COLUMBIA.

ELECTRIC RAILWAY-SIGNAL.

SPECIFICATION forming part of Letters Patent No. 712,333, dated October 28, 1902.

Application filed April 8, 1902. Serial No. 101,884. (No model.)

*To all whom it may concern:*

Be it known that I, CHARLES V. RICHEY, a citizen of the United States, residing at Washington, in the District of Columbia, have invented certain new and useful Improvements in Electric Railway-Signals; and I do declare the following to be a full, clear, and exact description of the invention, such as will enable others skilled in the art to which it appertains to make and use the same.

This invention relates to an electric signaling system for railways, and particularly to a system of that character in which the track is divided into blocks or sections, and the signaling means are employed to give notice to the engineer of a train on one block or section that the block ahead is either free for travel or occupied by another train, thereby enabling the engineers of trains to ascertain positively whether or not the track is clear for a determined distance ahead and avoiding liability of collisions.

The object of the invention is to provide an electric signaling system which shall be positive and certain in action and composed of a minimum number of parts not liable to get out of order under any of the ordinary conditions of service.

The invention consists of certain novel features and parts and combinations of the same, as will be fully described hereinafter and then pointed out in the claims.

A practical embodiment of the invention is represented in the accompanying drawings, in which similar characters of reference indicate corresponding parts in both views.

Figure 1 is a diagrammatic plan view illustrating several blocks or sections of a railway-track equipped with my invention, and Fig. 2 is a similar view illustrating the operation when trains are on adjacent blocks.

In carrying my invention into practice one of the rails of a track is made to form a continuous conductor, as by electrically connecting the rail-sections thereof in any preferred manner, while the other rail is formed into blocks or sections of any preferred length, which, as a simple illustration, may be accomplished by insulating the adjoining ends of rails at regular intervals apart along the line of the track. In any event the blocks or sections shall be longer than the longest train and may be, according to circumstances or conditions, from, say, one to twenty miles in length.

The letter A in the drawings represents the continuous conductor-rail, and B B' B² B³, &c., the sections of the other rail dividing the track into the blocks.

Connected with the rail-sections B B', &c., are batteries C, C', C³, and C⁴. These batteries are arranged at the junction-points of the said sections, and the positive pole of each battery is connected to the end of one section and the negative pole of the battery to the end of the next adjacent section. In addition the sections are made alternately negative and positive sections, as by connecting the ends of a section to similar poles of adjacent batteries. As an illustration it will be seen that the section B' is connected to the negative poles of the batteries C and C', while the section B² is connected to the positive poles of the batteries C' and C³, and in this manner the sections and batteries are connected up along the entire trackway. A signal D of any desired kind, but shown in the present instance in the form of a lamp, is in circuit with each battery and is operated upon the completion of the circuit by the connection of the rail A and two negative and positive rail-sections through the wheels and axles of one of the trucks of a locomotive or car. I may employ any kind or character of signaling device adapted to be operated by an electric current.

E and E' in Fig. 2 represent the front trucks of the locomotives of two trains running on the track and located on adjacent blocks B' B². Assuming that these trains are running in the same direction and toward the left in Fig. 2, the operation will be as follows: As each train passes from one block or section to another, as from block B' to block B, said sections will be electrically connected with one another and with the rail A by the wheels and trucks, and as one section is connected with the positive and the other with the negative poles of the adjacent batteries the circuit will be completed by the passage of a current from one block-section to the rail A and thence from the rail A to the other section through the wheels and axles and finally through the adjacent battery-circuit, whereby the signal D will be brought into action to display a light or to indicate in any other preferred manner the passage of a train. In a similar manner each signal will be operated as the train passes from block to block along the entire trackway. When two trains running in the same direction along the track are upon adjacent blocks, as indicated by the trucks E and E' on the blocks B' and B², the positive and negative poles of the interposed battery C' will be connected through the rail A and wheels and axles of the trucks and a current will pass therethrough, as indicated by the arrows in Fig. 2, thereby operating the signal D in circuit with said battery C'. By this means the engineer of the rear trail will be notified that a train is running on the block ahead and may stop or govern the running of his train in such manner as to prevent a collision. The same result will be secured when the trains are running in opposite directions or toward each other, as on a single-track road, and in this case both engineers will be warned by the display of the signal D at the junction between them.

It will thus be seen that my invention provides a signaling system which is applicable to both single and double track roads and is designed to secure safety in the running of trains under all conditions of service; also, that owing to the extreme simplicity of construction and small number of parts employed failure of any of the signals to operate is not liable to occur when reasonable care in inspecting the line at intervals is exercised.

Freedom from a multiplicity of mechanical parts, furthermore, renders the device positive and certain and not liable to disorder, as the parts may be readily protected from casual injury or from being affected by climatic changes.

Having thus described my invention, what I claim, and desire to secure by Letters Patent, is—

1. In an electric signaling system for railways, the combination of track-rails, one forming a continuous conductor and the other divided into blocks or sections, batteries at the junction-points of the sections, each battery having one pole connected to the end of one section and the other pole to the contiguous end of the next section, the ends of a section being connected to similar poles of adjacent batteries, whereby the sections are made alternately negative and positive, and a signal in circuit with each battery, substantially as described.

2. In an electric signaling system for railways, a trackway, one of the rails of which forms a continuous conductor and the other divided into blocks or sections, circuit connections between adjacent sections, batteries in said circuits, the poles of the batteries being connected up to make said sections alternately negative and positive, and a signal operated by each battery-circuit, substantially as set forth.

In testimony whereof I have hereunto set my hand in presence of two subscribing witnesses.

C. V. RICHEY.

Witnesses:
BENJ. E. COWL,
M. A. BAXTER.